United States Patent

[11] 3,623,562

[72] Inventor Svatopluk Paul Pitra
507 East 73 St., New York, N.Y. 10021
[21] Appl. No. 313
[22] Filed Jan. 2, 1970
[45] Patented Nov. 30, 1971
Continuation-in-part of application Ser. No. 732,801, May 13, 1968, now abandoned. This application Jan. 2, 1970, Ser. No. 313

[54] AUTOMOBILE-PARKING SYSTEM
7 Claims, 6 Drawing Figs.
[52] U.S. Cl. .................................................. 180/1 A
[51] Int. Cl. .................................................. B60s 9/18
[50] Field of Search ........................................... 180/1 A

[56] References Cited
UNITED STATES PATENTS
1,764,486 6/1930 Woolley ........................ 180/1 A
2,158,891 5/1939 Beacher ........................ 180/1 A
3,266,587 8/1966 Roberts ......................... 180/1 A Primary Examiner—A. Harry Levy
Attorney—Polachek & Saulsbury ABSTRACT: A lateral drive assembly for an automotive vehicle has four parking wheels carried by parking legs which are rotatable between lowered vertical positions and elevated positions. The parking wheels are operatively coupled to the main drive shaft of the vehicle via gear trains which are disengaged from the main shaft when the parking legs and parking wheels are elevated. The parking legs and wheels are rotated between lowered and elevated positions by mechanisms independent of the gear trains which couple the parking wheels to the main shaft.

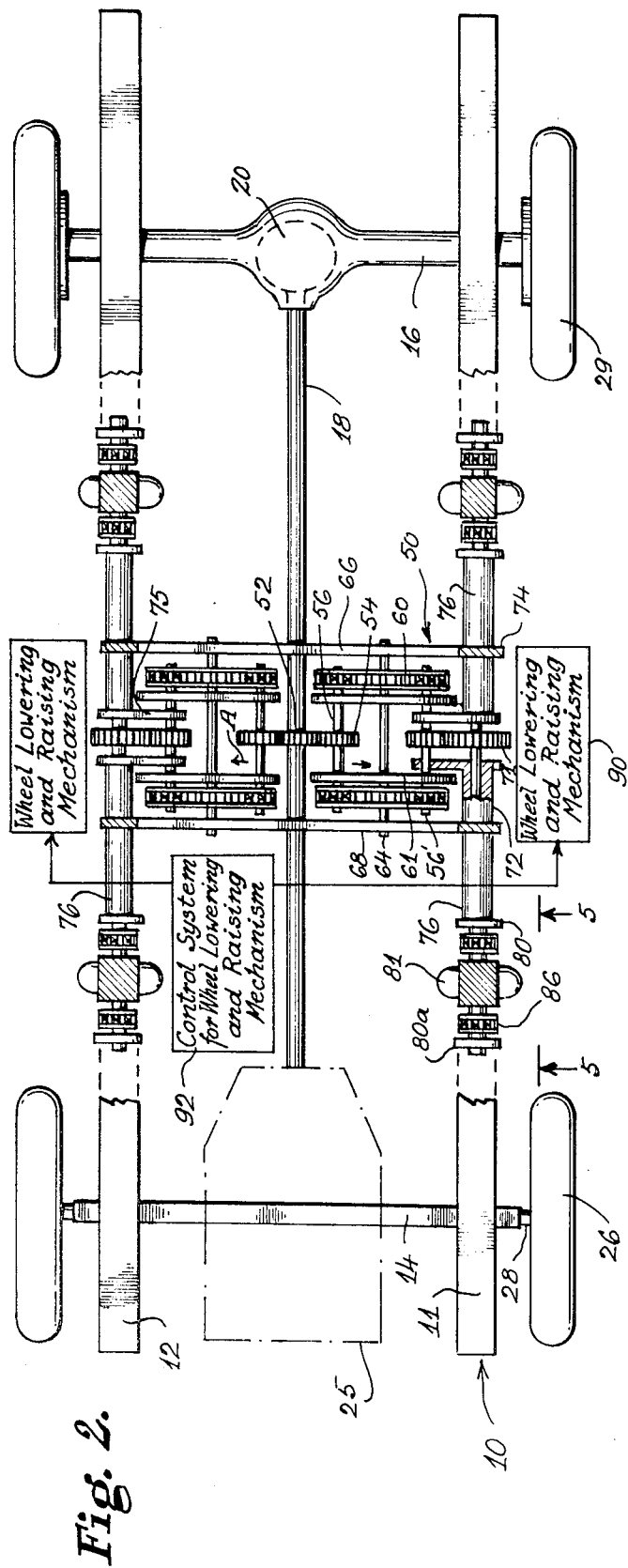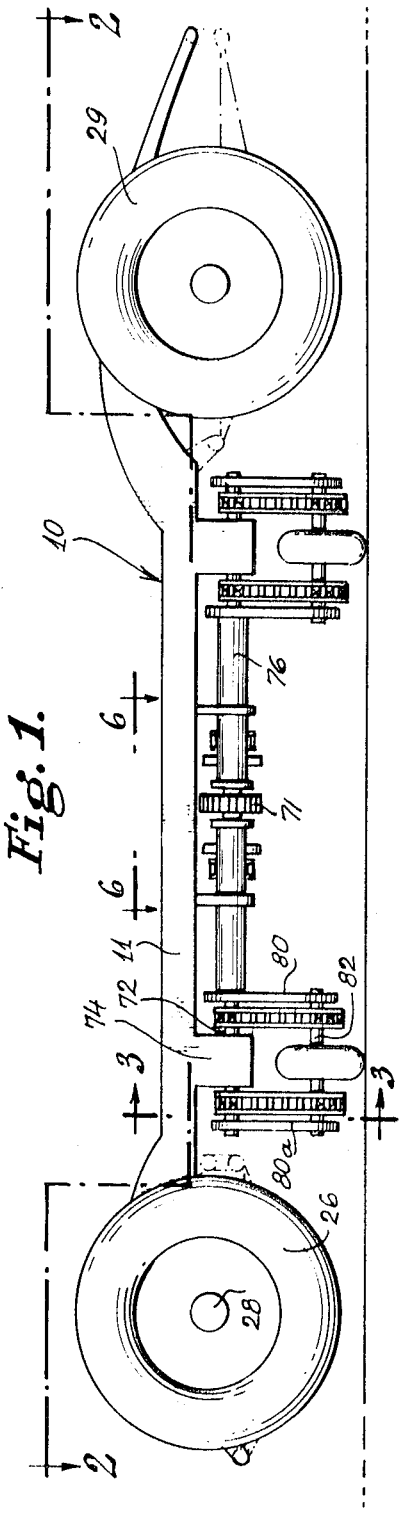

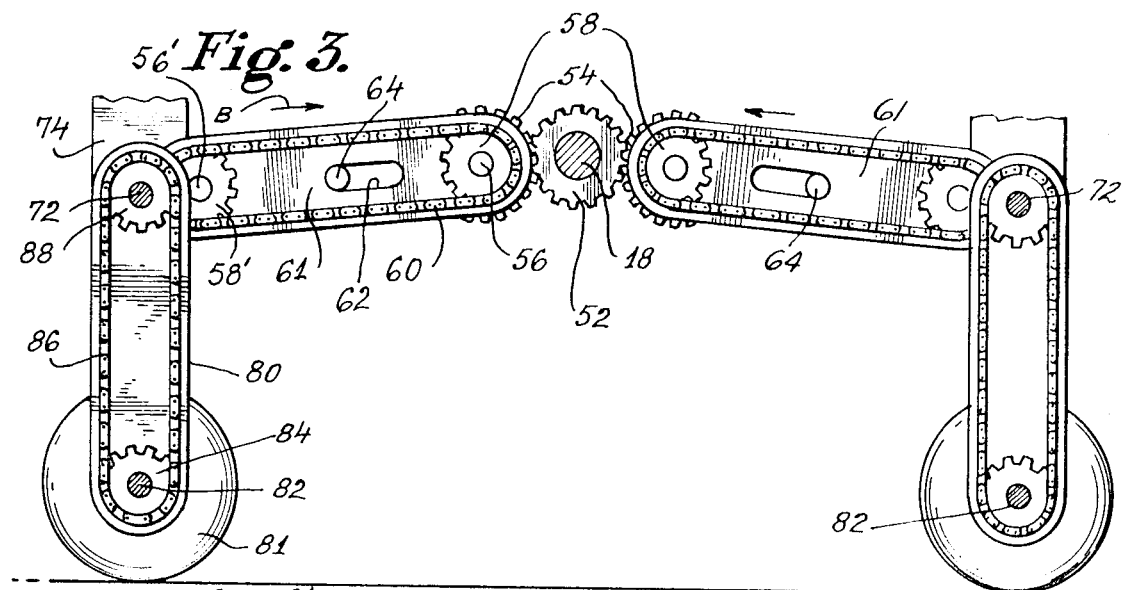
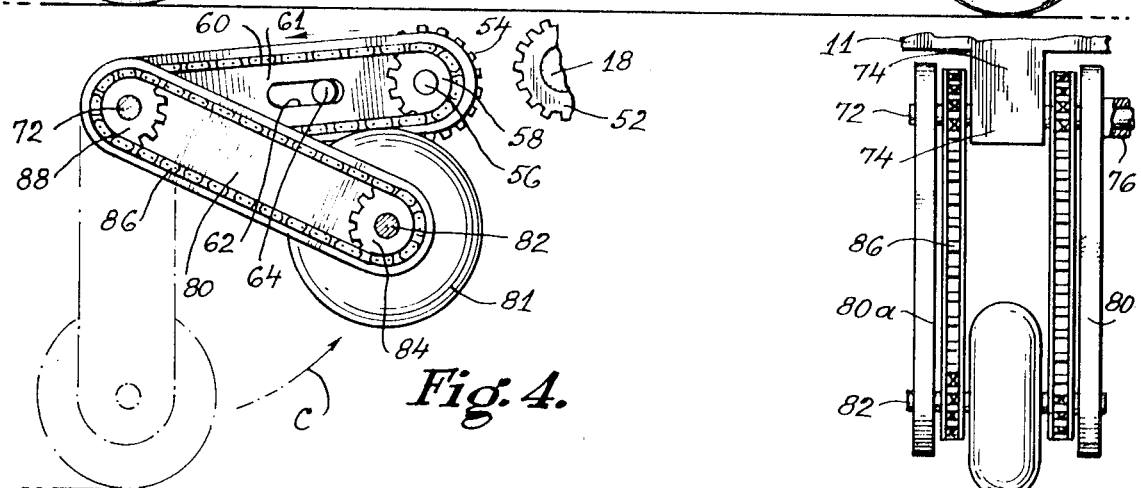
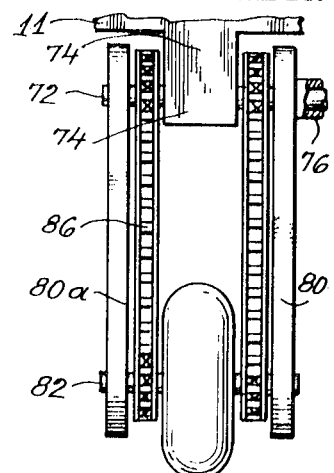
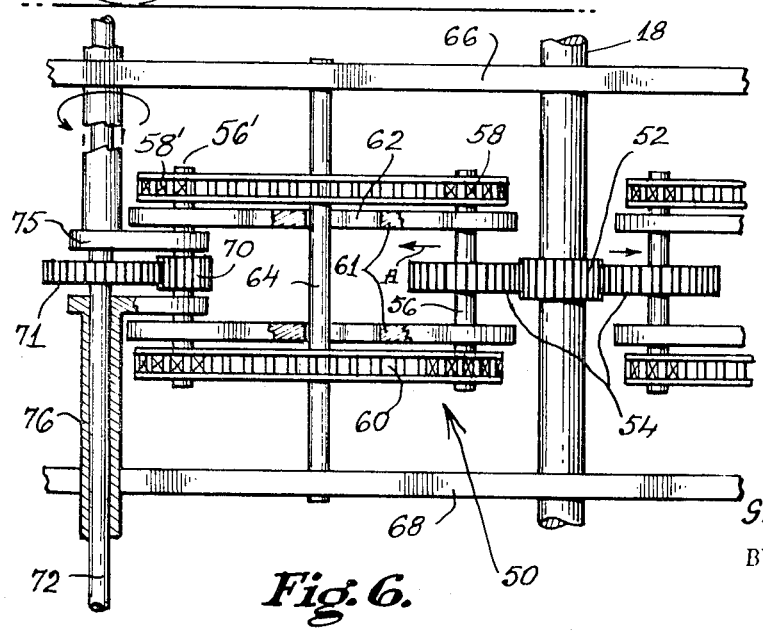

AUTOMOBILE-PARKING SYSTEM

This application is a continuation-in-part to my patent application Ser. No. 732,801 filed May 13, 1968, and since abandoned.

This invention concerns a parking system for an automotive vehicle including a mechanism for driving the vehicle laterally into and out of a parking place.

Self-contained parking devices for automotive vehicles heretofore proposed have been characterized by their complexity, massive structure, high cost, and difficulties encountered in operation and servicing. For these reasons, they have not attained acceptance by the automotive vehicle-manufacturing industry and by the public.

The present invention is directed at overcoming the above and other difficulties and disadvantages of prior self-contained automobile-parking devices. According to the invention, a parking assembly includes a mechanism which transmits the driving power of an engine in a longitudinal drive shaft to an auxiliary lateral-drive mechanism forming part of the parking assembly. The assembly further includes legs which can be raised or lowered by turning on a horizontal axis which is parallel to the main drive shaft. The legs are turned in vertical planes by an operator-controlled lowering and raising mechanism which can be hydraulic. The legs carry parking wheels oriented perpendicularly to the main wheels of the vehicle for driving the vehicle laterally into a parking space. The parking wheels are operatively connected via gear trains to driven gears which are advanced to engage a parking gear on the main drive shaft when the legs and parking wheels are lowered. When the legs and wheels are raised the driven gears are automatically retracted from the parking-drive gear. To drive the vehicle laterally to the right or left, the driver throws the transmission-control lever of the vehicle to reverse or forward-drive position. At this time the parking legs are lowered and the main wheels are elevated off the ground. The vehicle is carried only by the four parking wheels The vehicle thus moves to the right or left until the driver throws the transmission-control lever to neutral position. By this means the vehicle can move selectively into or out of a parking space which may be not much longer than the vehicle itself.

The assembly is easy to manufacture. It employs interchangeable, similar parts. It is easy to maintain, repair and service. It is comparatively inexpensive, light in weight and requires no extensive changes in present automotive vehicle construction. It is simple to operate and requires no special skill or training. The assembly can also be used to advantage when tires are being changed, antiskid chains are being installed, and for other servicing operation. It can also be used to advantage when a vehicle encounters difficulties in snow, soft or muddy ground, and the like.

The invention is explained below in detail with particular reference to the drawings, wherein:

FIG. 1 is a side view of the chassis of an automotive vehicle equipped with an assembly embodying the invention.

FIG. 2 is a top plan view partially in section of the chassis and assembly taken on line 2—2 of FIG. 1, parts being omitted or broken away, and other parts of system being shown diagrammatically.

FIG. 3 is an enlarged vertical sectional view taken on line 3—3 of FIG. 1 showing only pertinent portions of the lateral-drive parking mechanism, with parking legs and wheels shown in lowered position, and with driven gears engaged with the main parking drive gear.

FIG. 4 is a fragmentary sectional view similar to a portion of FIG. 3 showing a parking leg and wheel elevated, with driven gear retracted from the parking-drive gear.

FIG. 5 is an enlarged fragmentary side elevational view similar to a portion of FIG. 1, but taken on line 5—5 of FIG. 2.

FIG. 6 is an enlarged plan view similar to a portion of FIG. 2 but taken on line 6—6 of FIG. 1.

Referring to the drawing, there is shown in FIGS. 1 and 2 parts of chassis frame 10 of an automotive vehicle, including two laterally spaced horizontal beams 11, 12. The beams are joined by a crossbeam 14 at the front and by tubular beam 16 at the rear. A horizontal main drive shaft 18 extends between differential 20 at the rear and engine 25 at the front. Two main front wheels 26 are engaged by axles 28 carried by the frame. Two rear wheels 29 are operatively coupled to shaft 18 via differential 20. To the extent described, the vehicle is conventional.

Now according to the invention, there is provided a parking assembly 50 including a main lateral-parking drive gear 52 secured on the main drive shaft 18. This parking assembly 50 is disengaged from gear 52 when the parking assembly is deactivated. This will be explained in FIG. 2. Each of gears 54 is carried by a driven shaft 56; see FIGS. 2 and 6. Shaft 56 also carries sprockets 58 at opposite ends. Chains 60 are engaged on the sprockets. Shaft 56 is mounted near one end of a pair of vertical parallel plates 61. A horizontal, longitudinally extending slot 62 is formed in each of plates 61. The slot is spaced from shaft 56. A horizontal stationary shaft 64 extends through slot 62 in each of plates 61 and is secured at opposite ends to rails 66, 68. These rails extend transversely of the chassis frame and are secured to beams 11, 12. By this arrangement the plates 61 can slide in vertical planes in the transverse directions indicated by arrows A in FIGS. 2 and 6 to retract gears 54 from gear 52.

At the other end of plates 61 is a horizontal shaft 56' carrying sprockets 58' on which are engaged chains 60. It will be apparent that when gears 54 are engaged with gear 52 and gear 52 is turned the sprockets 58 will turn and these will drive chains 60 which in turn will drive sprockets 58' and shaft 56'. Shaft 56' carries a spur gear 70 mashed with gear 71 carried by a shaft 72. Shaft 72 is disposed parallel to the main drive shaft 18. Each of the two shafts 72 is supported in bearings 74 depending from the lateral beams 11, 12 of the chassis frame. Each shaft 72 carries a pair of sleeve shafts 76. At one end of each sleeve shaft is a crank arm 75. Each shaft 56' is engaged at one end of a pair of parallel crank arms 75; see FIGS. 2 and 6. Each crank arm is integral with the sleeve shaft. At its other end, each sleeve shaft is integral with an elongated flat plate 80. A companion leg plate 80a is freely rotatable on the end of shaft 72. Each plate 80, 80a serves as a leg for the parking assembly. The legs or leg plates will rotate with the sleeve shafts and crank arms when the sleeve shafts are rotated. Each pair of leg plates 80 and 80a carries a horizontal shaft 82 on which is mounted one of four parking wheels 81 oriented in vertical transverse planes perpendicular to the planes of main wheels 26, 29. Also carried by each shaft 82 is a pair of sprockets 84. Engaged on these sprockets are chains 86. The chains are engaged further on sprockets 88 carried by shaft 72. It will be apparent that each shaft 72 can rotate independently of the sleeve shafts 76 and of plates 80, 80a which it carries so that spur gears 70 drive gears 71 which in turn drive shafts 72, sprockets 88, chains 86, sprockets 84, shaft 82 and wheels 81.

The sleeve shafts 76 are rotated by means of an independent wheel-lowering and raising system indicated schematically in FIG. 2. A suitable wheel-lowering mechanism 90 is controlled via any suitable driver-operated control apparatus 92. The wheel-lowering mechanism 90 can be electrical, mechanical, and/or hydraulic in construction. The mechanism 90 can be constructed like any of the wheel-lowering mechanisms used in aircraft, or like those shown in U.S. Pat. Nos. 2,416,838, and 3,266,587. Two similar mechanisms 90 actuated by common control 92 can be each coupled to a pair of sleeve shafts 76 ad indicated in FIG. 2. All sleeve shafts 76 and leg plates 80, 80a, will turn simultaneously. This will turn all four crank arms 75 simultaneously and cause slidable movement of all plates 61. When the leg plates 80, 80a carrying wheels 81 turn down to the position indicated in FIGS. 1, 2, 3 and 5, plates 61 are advanced toward shaft 18 as indicated by arrow B. This causes engagement of gears 54 with drive gear 52. When the leg plates 80, 80a and wheels 81 are turned up to the position indicated in FIG. 4, the crank arms revolve shafts 56' to retract plates 61 along with gears 54. Gears 70 remain meshed with gears 71 at all times.

It will thus be apparent that when the engine 25 is in gear, either forward or reverse, while the wheels 81 are elevated, the vehicle will operate normally running on the main wheels 26, 29. When the wheels 81 are lowered, the entire vehicle is carried by the four lateral-drive parking wheels 81. Thus the vehicle will move laterally in one direction or the other while it is in forward or reverse gear. The main drive wheels 29 of the vehicle will turn during lateral drive of the vehicle but this will not interfere with the lateral-drive parking operation. After the lateral-drive motion of the vehicle is completed, the transmission control of the vehicle will be set to neutral, and the mechanisms 90 will be operated to lower the vehicle by rotating the leg plates 80 upwardly as indicated by arrow C in FIG. 4. All leg plates will be raised simultaneously to lower the vehicle. The engine can then be thrown into gear again for driving the vehicle on its main wheels or it can be turned off if the vehicle has been positioned in a desired parking place.

The assembly described employs many similar parts which are interchangeable. This minimizes the stock of parts dealers must carry, and reduces the cost of manufacture since fewer dies must be used for stamping, forming and machining parts. The parking assembly can be installed in vehicles of existing design without material alterations. The assembly is rugged in construction and will require minimum care and servicing. It fulfills a longfelt need for a practical lateral-drive system for an automotive vehicle.

Although a particular mechanism has been described it will be apparent that many changes are possible without departing from the invention. For example, friction wheels can be substituted for gears. Conical or helical gears can be employed instead of circular gears and chains, etc.

What is claimed is:

1. A lateral-drive assembly for parking an automotive vehicle having a chassis frame carrying a main engine-driven shaft operatively coupled to main wheels supporting the vehicle, comprising a plurality of parking legs rotatable in vertical planes and carrying parking wheels oriented in vertical planes perpendicular to the main wheels; supports carried by said frame and rotatably supporting said parking legs; mechanical transmission means operatively connecting said parking wheels to said main shaft to drive the parking wheels; means for rotating the parking legs between lowered vertical position and elevated position; and means operatively interconnecting said transmission means and legs and arranged for disengaging said transmission means from the main shaft when the parking legs are in said elevated position and for engaging the transmission means to the main shaft when the parking legs are in lowered vertical position, whereby the main wheels will be elevated above ground and the vehicle will be supported only by the parking wheels when the parking legs are in said lowered vertical position, the last-named means for engaging said mechanical transmission means with main shaft and for disengaging the transmission means from the main shaft comprises slidable members carried by said frame; crank arms engaged with said slidable members for advancing and retracting the slidable members radially relative to said driven shaft; and other shafts coupling said parking legs and crank arms to rotate together, so that rotation of the parking legs, other shafts and crank arms selectively engages said transmission means with said main shaft and disengages the transmission means from the main shaft.

2. A lateral-drive assembly as defined in claim 1, wherein said transmission means comprises gear trains, selectively coupled to and decoupled from the main shaft when the legs are alternately in lowered and elevated positions.

3. A lateral-drive assembly as defined in claim 1, wherein said transmission means comprises a drive gear on the main shaft, and driven gears carried by said slidable members for alternately engaging with and disengaging from said drive gear.

4. A lateral-drive assembly as defined in claim 1, further comprising control means for the leg rotation means which is independent of said transmission means so that the parking wheels are operatively driven by said main shaft independently of said control means.

5. A lateral-drive assembly as defined in claim 1, wherein said transmission means further comprises chains driven by said driven gears, and other gears driven by said chains.

6. A lateral-drive assembly as defined in claim 4, further comprising other chains driven by said other gears, sprockets engaged by said other chains, and mechanical means operatively interconnecting said sprockets and parking wheels, so that the parking wheels are driven by the main shaft when the drive gear and said other gears are mutually engaged.

7. A lateral-drive assembly as defined in claim 4, wherein one of said other shafts, one of said crank arms and one of said legs are all integrally joined together to rotate simultaneously on a horizontal further shaft carried by said frame.

* * * * *